Figure 1:
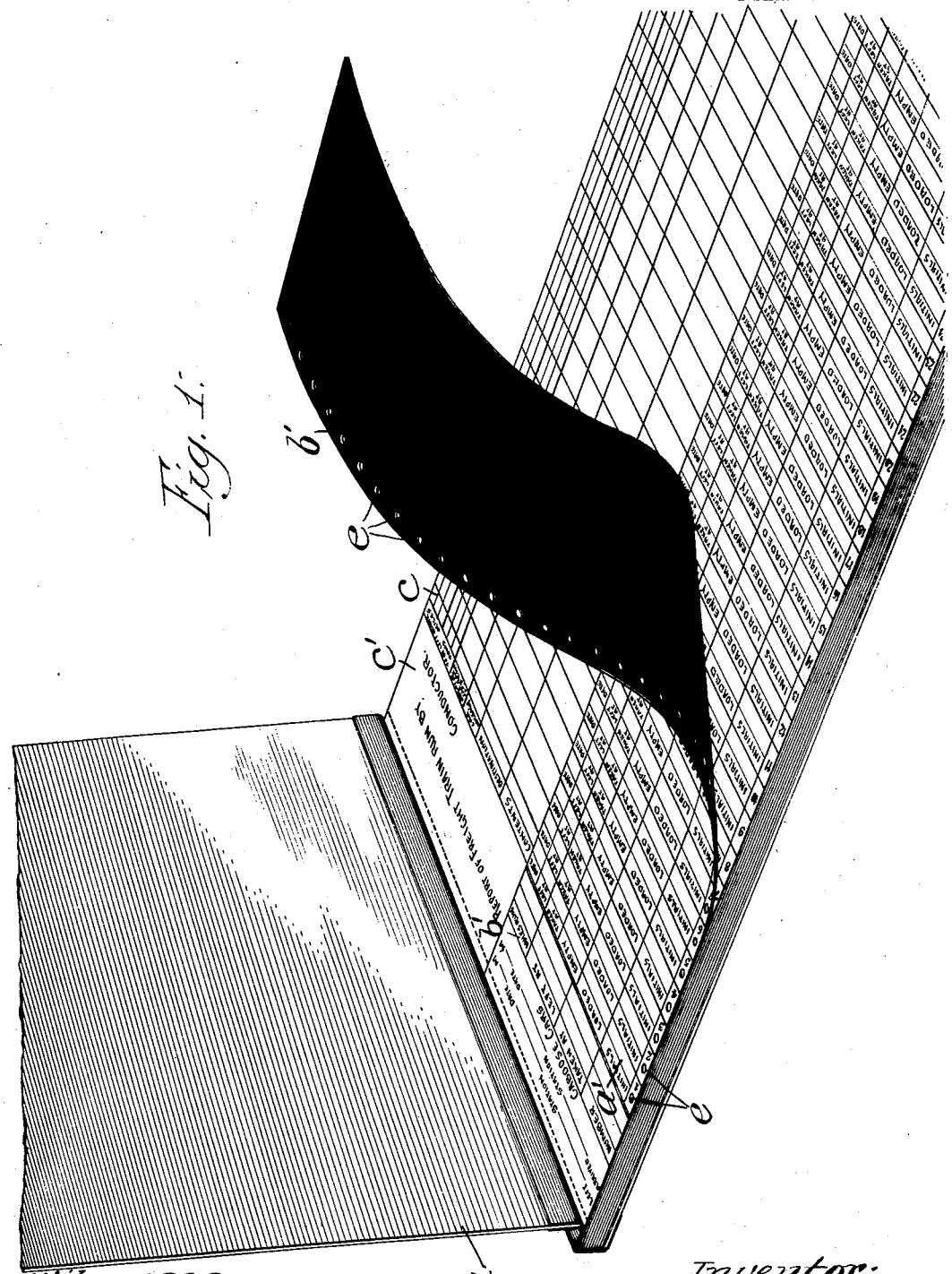

No. 832,451. PATENTED OCT. 2, 1906.
E. E. BETTS.
CAR REPORT SHEET BOOK.
APPLICATION FILED FEB. 3, 1906.

2 SHEETS—SHEET 1.

Witnesses:
Inventor:
Edward E. Betts,
By Thomas F. Sheridan,
Atty.

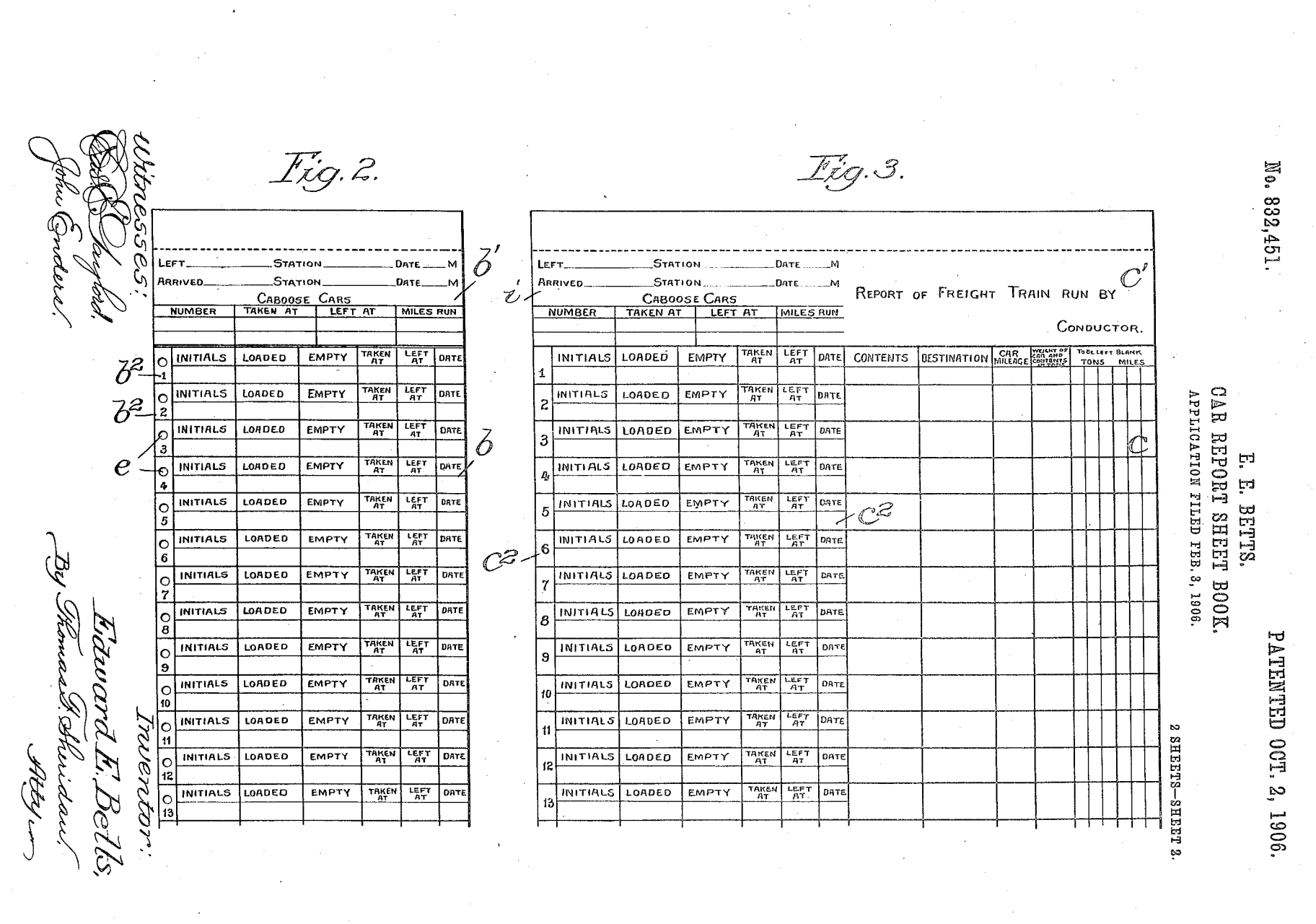

No. 832,451.   PATENTED OCT. 2, 1906.
E. E. BETTS.
CAR REPORT SHEET BOOK.
APPLICATION FILED FEB. 3, 1906.

2 SHEETS—SHEET 2.

Witnesses:

Inventor:
Edward E. Betts,
By Thomas F. Sheridan,
Atty.

UNITED STATES PATENT OFFICE.

EDWARD E. BETTS, OF EVANSTON, ILLINOIS.

CAR-REPORT-SHEET BOOK.

No. 832,451.  Specification of Letters Patent.  Patented Oct. 2, 1906.

Application filed February 3, 1906. Serial No. 299,324.

*To all whom it may concern:*

Be it known that I, EDWARD E. BETTS, a citizen of the United States, residing at Evanston, in the county of Cook and State of Illinois, have invented certain new and useful Improvements in Car-Report-Sheet Books, of which the following is a specification.

My invention relates particularly to record-books by which reports may be made of the movements of each and every car on each and every train leaving any desired starting point or points for any desired destination, as will more fully hereinafter appear.

The principal object of my invention is to provide a simple, economical, and efficient report whereby the labor of keeping the reports may be greatly lessened, the liability of mistakes eliminated, and the work facilitated.

The invention consists in the features and details hereinafter described and claimed.

In the accompanying drawings, Figure 1 represents a book made in accordance with my invention; Fig. 2, a view of a portion of one of the leaves, and Fig. 3 a view of a portion of another leaf.

In carrying out my invention I provide a book $a$, composed of a series of narrow leaves $b$, alternating with a series of wide leaves $c$, the width of the wider leaves being equal to the entire width of the book, while the width of the narrow leaves is approximately one-half that of the wider leaves. The narrow leaves are provided at the top portion with a suitable space $b'$, giving the data of the movements of the train as a whole, with the number of cars, miles run, &c. The remainder of the page is divided into a series of similar strips $b^2$, provided with the necessary ruled spaces with indicia for indicating what should be written in the spaces. For instance, in the drawings I show the similar strips with a series of spaces indicating the initials of the car, whether loaded or empty, where taken, where left, and the date. These pages may also be provided with perforations $e$ along one edge, there being a perforation for each of the strips for the purpose of collecting the strips upon a suitable file, as hereinafter described. These narrow strips may also be provided, if so desired, with carbon or other copying-surface on the under sides of the pages. The wider pages are ruled and printed on one side in the same manner as the narrower strips—that is, one half of the wider page contains an exact duplicate of the matter found upon the narrower page, and the pages are bound together, so that the matter upon the narrower page will be in register with the similar matter on the wider page. As shown, the spaces $c^2$ of the wider page are duplicates of the spaces $b^2$ of the narrower page, while the space $c'$ at the top of the wide page is a duplicate of the space $d'$ of the narrow page.

The remaining half of the wide page is ruled to receive other data concerning the cars and their movements—such as the contents, destination, mileage, weight of the car, &c.—there being spaces on this half of the page for this information corresponding in number to the spaces on the other half of the page. It will now be understood that when entries are made upon the narrow pages they are reproduced upon the half of the wide page corresponding to the narrow pages, the wide page also containing other information, as above described.

In order to appreciate fully the advantages of my invention, it will be necessary to set forth somewhat in detail the usual routine followed in keeping the records in a car-accountant's office. As is well known, in such an office there is a large amount of lost time in making car-reports.

A car-record is made from conductors' wheel-reports, showing cars handled on their respective trains; agents' interchange reports, showing cars received from and delivered to connecting-lines, and junction-reports received from railroads, showing the delivery of a car to any line except the owner road.

On a railroad owning fifty thousand cars and having fifteen thousand foreign cars on the line there would be about thirty thousand records to enter daily. Each clerk is assigned about three thousand home cars and twelve hundred foreign cars and will make between twelve hundred and fifteen hundred entries on a local or home record and about one-half as many on a foreign record. In order to make these entries, each clerk must look over, say, one thousand wheel-reports, three hundred interchange-reports, and two hundred junction-reports, or fifteen hundred in all, taking therefrom an average of two cars per report. After locating his car on the report he must then turn to the proper place in his book and make the entry. It will be readily seen that it is no small problem to keep these fifteen hundred reports circulating properly, so that each clerk will have work all the time. It will also be observed that each clerk must rest his eye on each car-number on each report, or thirty thousand car-numbers daily, which consumes a great deal of time, and after locating his car additional time is consumed in turning to the proper place in the book where the entry is to be made, so that the time consumed in actually writing the record in the book is a small per cent. of the total time consumed in the entire transaction. To do away with this lost motion and permit the record clerk to devote his entire time to the actual writing of the record in the book, this improved car-record book has been provided.

When the conductor has filled out each and every number for every individual car of which the train is composed, he tears out the narrow sheet upon which the entries have been made and sends it to the car-accountant's office. A number of these strips or leaves are then piled up together and passed through a cutting-machine, which separates each one of the individual portions of the sheet along the division-line. A boy then separates the home-records from the foreign and private-line records, for which two boxes are provided. These boxes are to be lettered "Home records" and "Foreign and private-line records." The home-car-record tickets will then be separated by the two ending numbers, one hundred boxes being provided for this purpose, lettered "00," "01," "02," "03," "04," and so on up to and including "99." The foreign records will be separated in accordance with initials, boxes being provided for each road or private-car line. After these separations are made the records are then ready for distribution to the clerks in accordance with work assigned. Duplicate boxes are provided for clerks lettered as above in accordance with the assignment of work.

In place of separating the portions of the sheet into the boxes these portions may by the perforations e be placed upon suitable files and then distributed to the proper clerks.

It will be seen that by my improved book I do away with the scrutinizing by each record clerk of each report-sheet for the purpose of selecting from such sheets the entries to be made by him. I thus do away with all liability of mistake, as there will be no skipping or overlooking by the clerks of their records on the reports. I also do away with the necessity of transcription of each individual record by type-writer, as has sometimes been done. This latter method is slow, and both the type-writer and hand transcriptions present the same difficulty—that is, likelihood of mistake by transposition in numbers and initials. My blanks provide that each individual record is furnished by the party making the report. These records come to the general office in sheets and are cut into strips by means of a paper-cutter. I find in practice that five hundred or more of these sheets can be cut into strips or blocks in one operation.

I claim—

1. A car-report-sheet book comprising a series of wide leaves and a series of narrow leaves bound together in alternate order, the narrow leaves having indicia indicating the general movement of the entire train and also having thereon marks indicating division-lines and each division having indicia indicating the marks, condition and location of a car, said narrow leaves also provided with means whereby each division may be separately filed.

2. A car-report-sheet book comprising a series of wide leaves and a series of narrow leaves bound together in alternate order, the narrow leaves being printed in similar sections, each section having appropriately-designated spaces for recording the marks, condition and location of a car, the wide leaves having a portion printed in the same manner as the narrow leaves, which portion or the printing on which portion is in register with the corresponding printing on the narrow leaves when the books are bound, each section of the narrow leaves being provided with means whereby it may be separately filed.

3. A car-report-sheet book comprising a series of wide leaves and a series of narrow leaves bound together in alternate order, the narrow leaves being printed in similar sections, each section having appropriately-designated spaces for recording the marks, condition and location of a car, the wide leaves having a portion printed in the same manner as the narrow leaves, which portion or the printing upon which portion is in register with the corresponding printing on the narrow leaves when the books are bound, said wide leaves also having other appropriately-designated spaces for recording other statistics as may be desired, and each section of the narrow leaves being provided with means whereby it may be separately filed.

EDWARD E. BETTS.

Witnesses:
ANNIE C. COURTENAY,
WILLIAM T. JONES.